(12) United States Patent
Von Düring (10) Patent No.: US 10,767,904 B2
(45) Date of Patent: Sep. 8, 2020

(54) METHOD FOR UTILIZING THE INNER ENERGY OF AN AQUIFER FLUID IN A GEOTHERMAL PLANT

(71) Applicant: von Düring Management AG, Lucerne (CH)

(72) Inventor: Bodo Von Düring, Lucerne (CH)

(73) Assignee: VON DÜRING MANAGEMENT AG, Lucerne (CH)

( * ) Notice: Subject to any disclaimer, the term of this patent is extended or adjusted under 35 U.S.C. 154(b) by 240 days.

(21) Appl. No.: 15/569,780

(22) PCT Filed: Apr. 26, 2016

(86) PCT No.: PCT/CH2016/000072
§ 371 (c)(1),
(2) Date: Oct. 27, 2017

(87) PCT Pub. No.: WO2016/172807
PCT Pub. Date: Nov. 3, 2016

(65) Prior Publication Data
US 2018/0135892 A1    May 17, 2018

(30) Foreign Application Priority Data

Apr. 27, 2015   (CH) .......................................... 580/15

(51) Int. Cl.
*F24T 10/20*    (2018.01)
*F24T 10/00*    (2018.01)

(52) U.S. Cl.
CPC .......... *F24T 10/20* (2018.05); *F05D 2260/61* (2013.01); *F05D 2260/611* (2013.01); *F24T 2010/56* (2018.05); *Y02E 10/14* (2013.01)

(58) Field of Classification Search
CPC ........... F05D 2260/611; F05D 2260/61; F02C 7/224; F24T 2010/56; F24T 50/00; F24T 10/20; Y02E 10/14
See application file for complete search history.

(56) References Cited

U.S. PATENT DOCUMENTS 3,950,137 A  *  4/1976  Larson ................. G01N 27/021
                                                     422/81
4,522,728 A       6/1985  Gallup et al.
(Continued)

FOREIGN PATENT DOCUMENTS

| JP | 06257479 A | 9/1994 |
|----|------------|--------|
| JP | 2014515711 A | 7/2014 |

(Continued)

OTHER PUBLICATIONS

International Search Report for corresponding International Application No. PCT/CH2016/000072 dated Oct. 10, 2016, and English translation.
(Continued)

*Primary Examiner* — Mark A Laurenzi
*Assistant Examiner* — Xiaoting Hu
(74) *Attorney, Agent, or Firm* — Renner, Otto, Boisselle & Sklar, LLP (57) ABSTRACT

A method for utilizing the inner energy of an aquifer fluid includes geothermal thermal water mixed with gas and optionally crude oil in a closed cycle to obtain an environmentally-neutral, carbon-dioxide-free utilization of the aquifer fluid and an environmentally-friendly supply of electric and thermal energy. An aquifer fluid is removed from an aquifer by means of a removal device, gas is separated by degassing the aquifer fluid in a gas-separation device, optionally crude oil is separated if necessary, the heat energy of the thermal water is utilized in at least one system for utilizing the thermal energy, the extracted gas and the (Continued)

optionally separated crude oil is combusted in at least one combustion device and the inner energy of the gas is utilized by operating a generator, the $CO_2$ being removed from the waste gas and recycled into the aquifer.

17 Claims, 7 Drawing Sheets

(56) References Cited

U.S. PATENT DOCUMENTS

| | | | |
|---|---|---|---|
| 5,582,011 A | 12/1996 | Bronicki et al. | |
| 5,970,714 A | 10/1999 | Bronicki et al. | |
| 2010/0043433 A1 | 2/2010 | Kelly | |
| 2010/0293946 A1* | 11/2010 | Vick | F02C 3/08 60/643 |
| 2011/0150730 A1* | 6/2011 | Baugh | B01D 53/1475 423/228 |
| 2011/0272166 A1 | 11/2011 | Hunt | |
| 2012/0038174 A1* | 2/2012 | Bryant | E21B 41/0064 290/1 R |
| 2013/0036748 A1* | 2/2013 | Lewis | E21B 43/164 60/783 |
| 2014/0130498 A1* | 5/2014 | Randolph | E21B 43/24 60/645 |
| 2015/0204239 A1* | 7/2015 | Minto | F02C 3/34 60/772 |

FOREIGN PATENT DOCUMENTS

| | | |
|---|---|---|
| JP | 2014517185 A | 7/2014 |
| WO | 2012/136967 A2 | 10/2012 |
| WO | 2012/142135 A1 | 10/2012 |
| WO | 2014/015307 A1 | 1/2014 |

OTHER PUBLICATIONS

Written Opinion of the International Searching Authority for corresponding International Application No. PCT/CH2016/000072 dated Oct. 10, 2016.

Basic et al., "Improved Utilization of Low-Temperature Thermal Water Rich in Hydrocarbon Gases", GHC Bulletin, Summer 1990, pp. 14-18 (cited in specification on Page 2).

* cited by examiner

METHOD FOR UTILIZING THE INNER ENERGY OF AN AQUIFER FLUID IN A GEOTHERMAL PLANT

CROSS REFERENCES TO RELATED APPLICATIONS

This application is a national phase of International Application No. PCT/CH2016/000072 filed Apr. 26, 2016, and claims priority to Switzerland Application No. 580/15 filed on Apr. 27, 2015, which is incorporated herein by reference.

TECHNICAL FIELD

The present invention describes a method for using the inner energy of an aqueous solution comprising gas from existing or new crude oil and/or natural gas sources. Inter alia such deposits comprise aquifers but also crude oil and natural gas deposits partially exploited with conventional methods for crude oil and natural gas production and stabilized by water injection, in particular salt water injection. In the scope of the present invention all these deposits will be termed aquifers for simplicity reasons and all liquids removed from the aquifer will be termed aquifer fluids. An aquifer fluid according to the present invention is a more or less salts or minerals containing water (subsequently referred to as geothermal water or geothermal thermal water or thermal water), mixed with gas and possibly crude oil and heated by means of geothermal energy. The inventive method uses the inner energy of an aquifer fluid in a closed circuit. Further subject matter of the invention are a hybrid geothermal plant for using the inner energy of geothermal water mixed with gas and optionally crude oil from an aquifer in a closed circuit, as well as a retrofitting method for existing geothermal plants for improved utilization of the energy of an aquifer fluid.

BACKGROUND ART

For a long time already the thermal energy of geothermal thermal water or thermal sole from aquifers is utilized. Underground layers of water-bearing permeable rock known as aquifers are found at various depths in the earth's crust in various geologic formations. Besides of thermal water, aquifers often also comprise gas deposits. Due to the high pressure in these depths the gas is dissolved in the thermal water and such a solution herein is termed aquifer fluid. The gases dissolved in the thermal water in general are combustible gases, the isolated energetic and chemical utilization of which is not profitable from an economic point of view. The gases dissolved in the thermal water comprise methane and other gaseous hydrocarbons, hydrogen and/or carbon monoxide as well as not combustible components such as water vapor and/or carbon dioxide. Upon production of the aquifer fluid, the gas expands, is expelled from the solution and has to be blown off or flared, thereby emitting climate relevant gases—unless it is used.

With todays drilling technology boreholes to deep aquifers can be produced so that aquifer fluid with initial temperatures of more than 60° C. can be produced from depths of up to several kilometers. Besides of using it for heating of buildings, the thermal water is also used for the generation of electricity. After the energetic utilization, the cooled thermal water is recirculated into the aquifer by means of a recirculation device.

As can e.g. be seen from "Improved utilization of low temp thermal water rich in hydrocarbon gases" by Bašić et al., GHC Bulletin, Summer 1990, in the past aquifer fluid comprising therein dissolved gas was pretreated prior to using the thermal energy. Thereby methane was separated from the aquifer fluid by means of a gas separation device. The energy of the thermal water was used in a device for using the thermal energy and the energy of the separated methane was made available by a subsequent combustion process. This combustion process on the one hand comprises the combustion of the separated methane in a gas engine with thereto connected generator for electricity generation, on the other hand the utilization of the heat energy obtained by the direct combustion of the methane for further heating the obtained thermal water. After utilization of the energy of the thermal water and the methane, the cooled thermal water is reinjected into the aquifer, whereby the energy needed for reinjection has been obtained by the methane combustion. By this method the energy comprised in the aquifer fluid is well but not optimally used.

The combustion of the methane according to Bašić generates flue gases so that this otherwise environmental friendly use of the inner energy of the aquifer fluid, due to the released flue gases, results in an environmental pollution similar to flaring.

In addition, today many crude oil deposits are already exploited and the still existing crude oil amounts can only be produced with enhanced effort which makes a (cost) efficient production method desirable. These deposits are extensively filled with water so that they are suitable aquifers in the sense of the present invention.

Due to the production method using water injection not only significantly exploited but also quite new crude oil deposits are suitable aquifers.

DISCLOSURE OF THE INVENTION

The problem to be solved by the present invention was to optimize the energetic utilization of the inner energy of geothermic thermal water mixed with gas and optionally crude oil in a closed circuit, wherein an environmentally neutral and $CO_2$-free utilization of the aquifer fluid and an environmentally friendly provision of electrical and thermal energy is achieved. In the scope of the present invention a closed circuit means a method wherein almost no emissions are generated, wherein, however, gas and optionally crude oil are removed (and optionally used elsewhere) and $CO_2$ (optionally also from other anthropogenic sources) is recirculated.

Where natural gas and crude oil are addressed together and where there is no difference whether natural gas or crude oil is concerned, also the term hydrocarbons is used below.

The method for using the inner energy of an aquifer fluid comprising geothermic thermal water mixed with natural gas (later on also referred to as gas only) and optionally crude oil in a closed circuit is characterized by the steps of producing aquifer fluid from an aquifer by means of a withdrawal equipment, separating gas by degassing the aquifer fluid in a gas separation device resulting in degassed thermal water, optionally separating crude oil in an oil separation device resulting in degassed and oil-free thermal water, using the heat energy of the degassed thermal water in at least one heat exchanger for heating at least one circulating heating medium, or for desalination of salt comprising water, like sea water, as well as performing at least one combustion process with the separated hydrocarbons in at least one combustion device and using the inner energy of the hydrocarbons by operating at least one generator, removing undesired substances from the flue (exhaust) gas by means of a flue gas treatment device comprising a gas scrubber, in particular an amine scrubber equipment, for removing $CO_2$ from the cooled flue gases, and reinjection of the $CO_2$ and the cooled thermal water into the aquifer.

The reinjection of $CO_2$ and thermal water can be done either separately (after transferring the $CO_2$ into the supercritical state) or after feeding the $CO_2$ to the cooled thermal water.

Dependent of the separator the separation of gas and crude oil can be performed in the same separator, but at present two separated separators are preferred.

In case of aquifers being under very high pressure, prior to the feeding of the aquifer fluid into the at least one separator it is reasonable or necessary to release its pressure to such an extent that afterwards it is under the overpressure provided for in the circuit. This can for example be done in that upstream of the separator the aquifer fluid is passed through a device for electricity generation. Suitable devices are turbines coupled to a generator or reverse running compressors.

In case of aquifers comprising gas as well as crude oil in the aquifer fluid, the crude oil can be removed from the plant and supplied to other utilizations or—which can be especially reasonable in case of low amounts of crude oil—be combusted directly within the plant and used analogous to the gas.

The flue gas purification can for example be optimized in that upstream of the combustion device a mixing device for mixing gas and optionally crude oil with combustion air is provided, wherein the mixing rate in the mixing device is controlled by means of a lambda sensor placed in the flue stream, and optionally preheating of the gas-(oil)-air mixture prior to its feeding into the combustion device. An alternative or additional possibility to optimize the composition of the flue gas comprises a flue gas purification device, in particular a catalyst, that is placed downstream of the combustion device and upstream of the gas scrubber. In most cases, however, flue gas purification or $CO_2$ separation, respectively, by means of gas scrubbing is sufficient.

If using gas as well as oil it is also possible and—dependent of the composition of the oil possibly preferred—to burn gas and oil in separate combustion devices. This can be advisable if e.g. another (catalytic) flue gas purification device should be provided downstream of the oil combustion than downstream of the gas combustion.

As an alternative or in addition, a crude oil purification can be provided upstream of the combustion so that substances that might affect the flue gas purification or the combustion, like heavy metals, sulfur compounds etc. are removed prior to the combustion and thus cannot deposit in the combustion device or get into the flue gas stream. Such methods are known to the skilled person from crude oil industry.

By means of the present method a flue gas free electrical and thermic utilization of locally available fossil deposits of aquifer fluids is achieved.

A further object of the present invention is a geothermal plant for using the inner energy of geothermic thermal water mixed with combustible gases and optionally crude oil from an aquifer in a closed circuit, comprising at least one withdrawal equipment for aquifer fluid, a gas and optionally oil separator for separating the aquifer fluid into thermal water, gas and optionally crude oil, at least one heat exchanger for using the thermal energy comprised in the thermal water for heating circulating heating medium or in a desalination plant, a combustion device for separated gas and optionally a combustion device for oil with at least one generator for generating electricity connected to each combustion device, a gas scrubber for separating the $CO_2$, in particular an amine scrubber, positioned in the flue gas stream downstream of devices for its thermal utilization, either a feeding line/pipe for feeding the $CO_2$ obtained after gas scrubbing into a recirculation line/pipe for the thermal water leaving the at least one heat exchanger, or a line/pipe directly into at least one recirculation equipment for reinjecting the carbon dioxide and the cooled thermal water through a reinjection borehole into the aquifer.

The reinjection of the $CO_2$ can be performed in two ways:

When the thermal water is sufficiently cooled, the $CO_2$ can be compressed and then pressed into the recirculation line/pipe for the thermal water that left the at least one heat exchanger and reinjected into the aquifer via the recirculation equipment together with the water. This method is especially suitable if the thermal energy of the aquifer has been used very intensively, i.e. the thermal water has been cooled to less than 35° C. and especially preferred to about 27° C. or less.

In the case of less intensive utilization of the thermal water, i.e. temperatures above 27° C., especially at least 35° C., it is also possible and preferred to compress the $CO_2$ until it reaches the supercritical state ($scCO_2$) and to recirculate it into the aquifer separately from the thermal water. This recirculation or reinjection is performed via a reinjection borehole down to depths where the pressure in the aquifer corresponds to about the pressure of the $scCO_2$ (in general at least 73 bar). This can be done by means of a wellhead that in addition to a reinjection line for the thermal water comprises a line for the $scCO_2$. Such a line for the $scCO_2$ can be a line concentrically positioned within the reinjection line, for example a concentric pipe, in particular a pipe made of chromium or a chromium alloy. After dissolving the $CO_2$ in the thermal water the solution can be fed even deeper into the aquifer, e.g. to depths of 2000 to 2500 m.

In a preferred embodiment the hybrid geothermal plant additionally comprises at least one mixing device for mixing the gases and optionally the crude oil with combustion air, said mixing device being positioned upstream of the at least one combustion device and/or a flue gas purification device, like a catalyst, placed downstream of the combustion device.

In a further preferred embodiment the geothermal plant additionally comprises at least one heat exchanger placed in the flue gas flow downstream of the flue gas purification device.

In still a further preferred embodiment the possible mixing of the $CO_2$ with the cooled thermal water is performed in a trickling scrubber, in particular in a trickling scrubber that is at least partially filled with packing, wherein the gas is present under the desired high pressure and is "trickled" with water until the water is saturated with $CO_2$.

The flue gas that in the upgrading/purification plant is treated by means of amine washing/scrubbing, in general has two features that are relevant for $CO_2$-separation; a relatively high volume flow and a relatively low $CO_2$ content. This means that for the absorption of the $CO_2$ a very high amount of active surface is needed for the reaction of the flue gas with the amine.

The active surface is the area where the flue gas and the amine washing solution do the mass transfer, i.e. where the $CO_2$ is chemically absorbed by the washing/scrubbing solution. This active surface preferably encompasses more than one, e.g. two, structured packing sections, each of them equipped with fluid collection and redistribution means. Collecting and redistributing ensures a more uniform concentration of the washing solution in all areas of the structured packings.

A further aspect to be considered is that the amine washing solution has a defined reaction rate. This requires an exactly defined, sufficiently long reaction distance that has to be determined under consideration of temperature and pressure. At a temperature of the amine washing solution of e.g. about 35° C. and a slight overpressure of about 16 bar the preferred column height is about 30 meters. In order to ensure good absorption, the flue gas is run in counter current to the washing solution. The flue gas and the washing/scrubbing solution must be provided with sufficient time and space for the reaction, which is ensured by the column height and the active surface. In order to achieve a demanded $CO_2$-content of less than 1% by volume and a high absorption efficiency in the treated flue gas, it is necessary to optimize the above described parameters and to comply therewith.

A suitable washing/scrubbing column comprises the following components:
Column sump for collecting the $CO_2$ enriched washing solution that is removed from the sump and fed to the ammonium carbonate cleavage,
liquidity inlets,
absorption and washing sections with structured packing,
liquidity collectors and redistributors between the washing sections,
demister
several connections for pipelines and measuring devices, as well as preferably
manholes.

Thus, for the above indicated parameters and a washing column comprising two absorption sections a minimal construction height of 30 m results.

In order to reduce the amine loss in the $CO_2$depleted gas at the outlet of the washing column, preferably a downstream washing device is installed on top of the column.

In this downstream washing device, the amine comprising vapor in the $CO_2$-depleted gas is cooled down by means of a heat exchanger so that the amine vapor solution condenses. This solution is advantageously recycled into the system by means of a demister.

Thereby also the loss of water from the reaction process is minimized which also significantly reduces the water demand in the washing process.

For the above-indicated parameters, a suitable downstream scrubber has a height of about 6 m so that the washing/scrubbing column including the downstream scrubber result in a total height of about 36 meters.

A further object of the present invention is the use of specific gas separators, optionally in combination with subsequent devices for using the thermal energy comprised in the hot gas, and/or of a combustion device with additional equipment ensuring an optimally clean combustion. Such devices can be adapted for modification of existing plants and optimized for use in respective modification processes.

BRIEF DESCRIPTION OF THE DRAWINGS

Further embodiments, advantages and applications of the invention result from the appended claims and the following description making reference to the Figures. These show FIG. 1 a schematic view of a geothermal plant comprising the devices/equipments necessary or very desirable for performing the inventive method,
FIG. 2 a schematic view of a geothermal plant equipped with more devices/equipments for performing the inventive method,
FIG. 3 a schematic view of a part of the geothermal plant of FIG. 1 for a process comprising crude oil production,
FIG. 4 a schematic view of a part of the geothermal plant of FIG. 2 for a process comprising crude oil production,
FIG. 5 a schematic view of a part of the geothermal plant of FIG. 2 and FIG. 4 with separate combustion of natural gas and crude oil.

MODES FOR CARRYING OUT THE INVENTION

In the figures a hybrid geothermal plant 1, connected with an aquifer 0 in a geological formation, is schematically shown. This aquifer 0 comprises aquifer fluid A that is thermal water T comprising gas G and optionally crude oil E. The aquifer fluid A preferably has an initial temperature Ti of 60° C. and more, as well as an initial pressure pi in the aquifer 0, that is higher than atmospheric pressure.

In principle any aquifer fluid A is a suitable aquifer fluid A, wherein aquifer fluids A of high temperature and with high gas content and optionally high crude oil content are preferred. In case of aquifer fluids with a salt content that is so low that upon recirculation of the optionally $CO_2$-enriched, cooled thermal water no crystallization occurs that might result in a plugging of the recirculation line, the maintenance work in general is low. Measures that in general prevent a plugging of the boreholes and lines are described below.

By means of at least one and preferably several, for example 4, withdrawal boreholes 100, that might go to a depth below the surface of several meters to some kilometers, at least one entrance to the aquifer 0 is achieved. By means of a withdrawal equipment 10 in the area of the respective withdrawal borehole 100, the aquifer fluid A is fed into the geothermal plant 1.

Preferably each withdrawal borehole 100 comprises a withdrawal equipment 10 and each withdrawal equipment 10 comprises a withdrawal pump. Withdrawal via more than one, preferably 4, withdrawal boreholes by means of one pump per borehole has the advantage that during common operation the pumps can be operated with reduced capacity, in the case of 4 pumps with e.g. ⅔ of their maximal capacity. Thereby the lifetime of the pumps can be enhanced and in case one pump is off, e.g. for service, the conveying capacity can be easily kept constant in that the capacity of the other pumps is increased.

The aquifer fluid A withdrawn from aquifer 0 by means of at least one withdrawal equipment 10 is fed to a gas separation device 11. In this gas separation device 11, gas G and in particular the share of pure methane or combustible hydrocarbons, respectively, are separated from the aquifer fluid A and further processed and used separately from the thermal water T.

The splitting of the aquifer fluid A into thermal water T and (methane rich) gas G is preferably performed by means of a separation device 11. In one embodiment of such a separation device 11 the surface area of the aquifer fluid A is markedly increased. Due to the large surface area, the high temperature of the aquifer fluid corresponding to the temperature Ti found in the aquifer (often 60° C. or more), and the pressure release of the aquifer fluid A from pi to a much lower pressure, such as slight overpressure of e.g. 20 to 500 hPa (all pressure information refers to overpressure over environmental pressure), the gas G is entirely or at least almost entirely separated from the thermal water. Further measures are not needed. The increase of the surface area in the separation device 11 is obtainable in different ways, in particular by subjecting the aquifer fluid to strong movements, for example by vigorous stirring, or by spraying the aquifer fluid A into the separation device 11 in the form of small droplets. The withdrawal of the gas is preferably performed continuously.

Since the separated gas G has a high water content, it is dried in a drying device 22 prior to its feeding into the combustion device. Thereby minimally diluted gas is fed to the gas combustion. Since the gas has an elevated temperature similar to Ti, its thermal energy can be used in at least one device for using thermal energy, like a heat exchanger 21, for example for (pre)heating the heating medium that afterwards obtains its final heat in a heat exchanger 12, 13, 14, operated with thermal water.

In an alternative gas separation device 11 the separation is not performed under slight overpressure but under substantial overpressure of usually about 3 bar (3000 hPa) at 104° C. The overpressure has the effect that less water is in gaseous form and is withdrawn together with the gas, resulting in a much lower load of the condenser. In order to nevertheless obtain a fast separation of gas and water, a lying, cylindrical pressure vessel is preferred, i.e. a separator whose horizontal extension is larger than its vertical extension. The aquifer fluid can also be sprayed into this separator, however, most often it is sufficient to merely feeding it on the one side, e.g. from the top, and to withdraw the degassed thermal water—as far away from the inlet as possible—on the opposed side of the pressure vessel at the bottom. Also with this separator, the withdrawal of the gas is preferably performed in a continuous manner and also with this gas separator 11 adapted to high pressure operation preferably a condenser is connected downstream.

Figure 1:
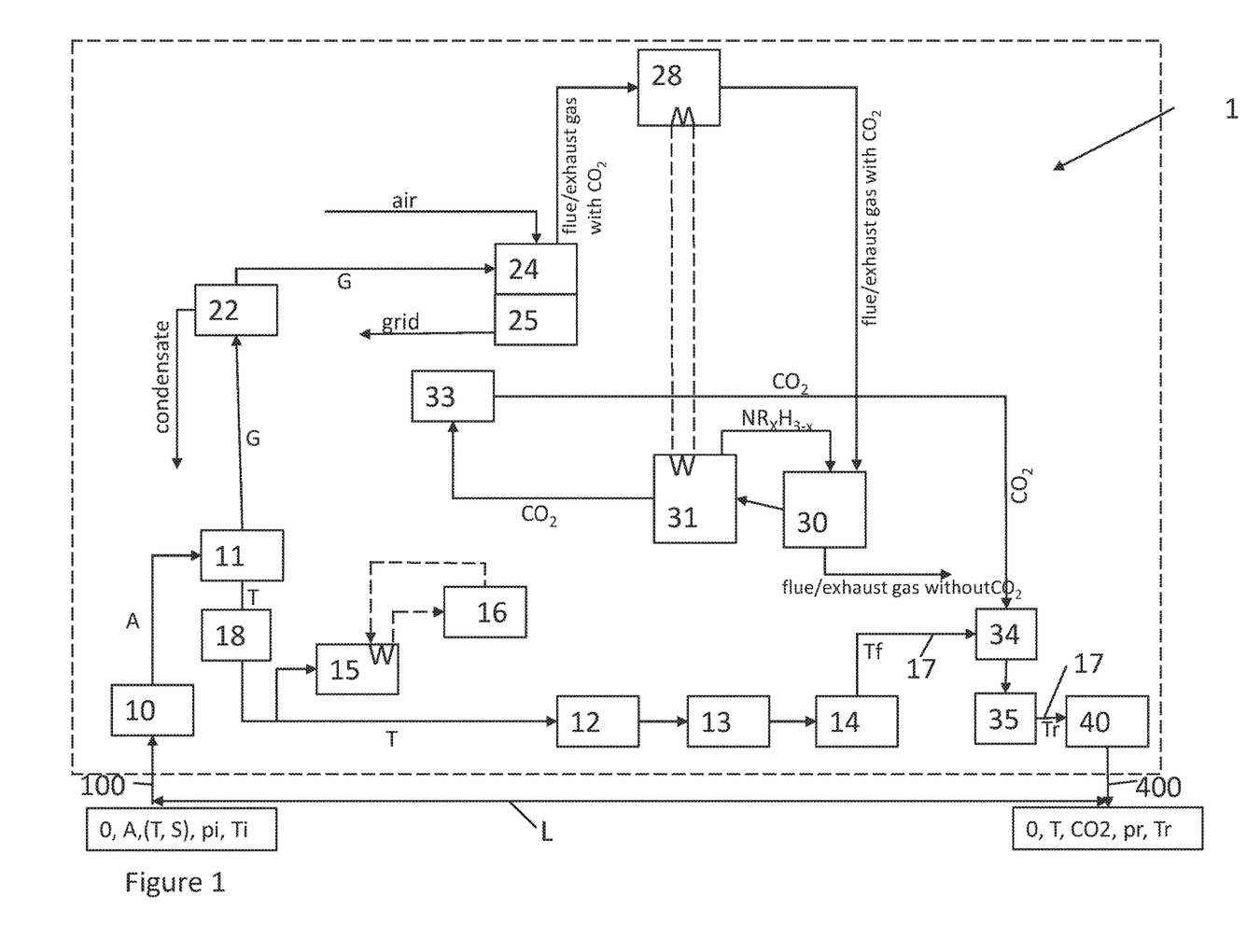
Figure 2:
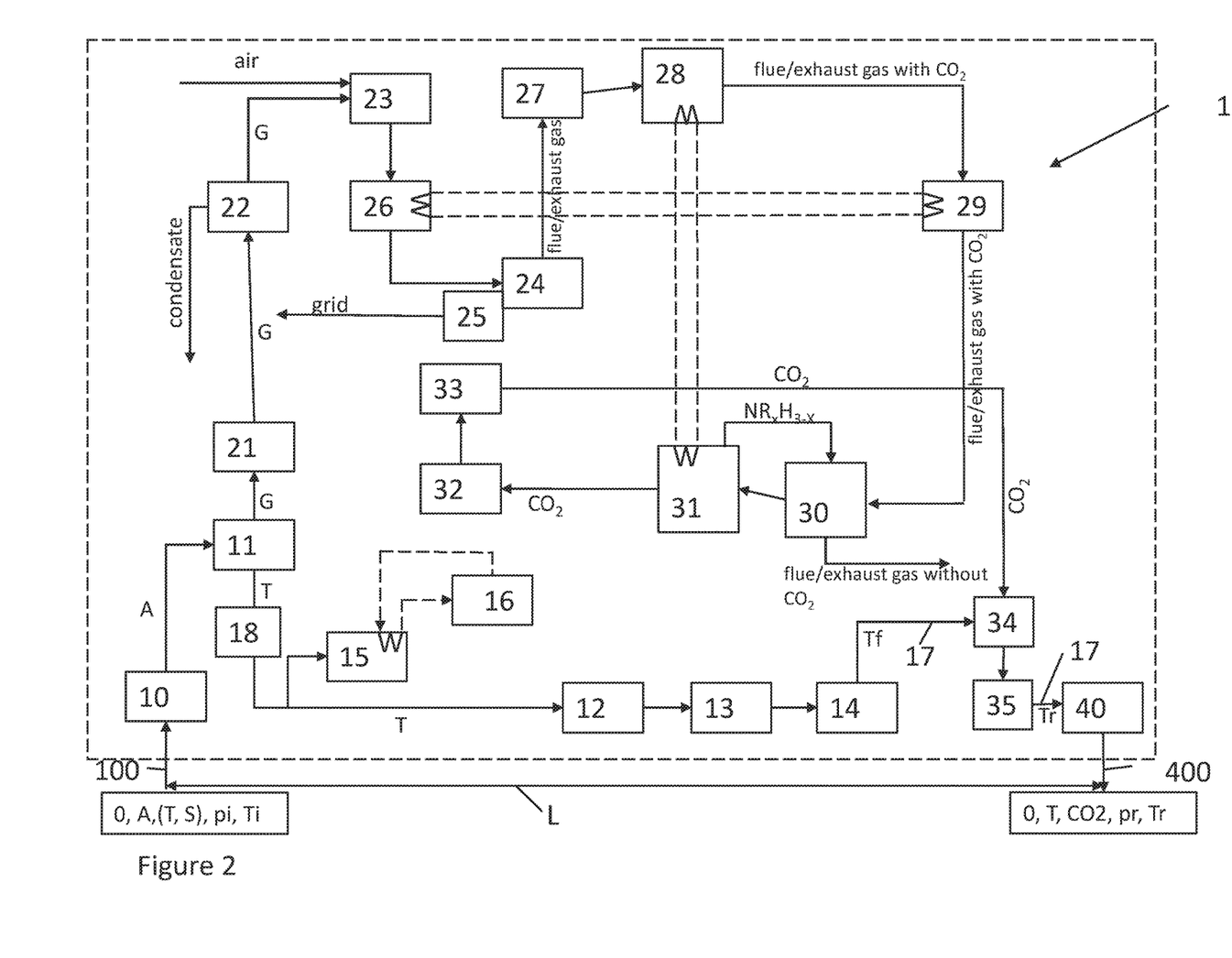
Figure 3:
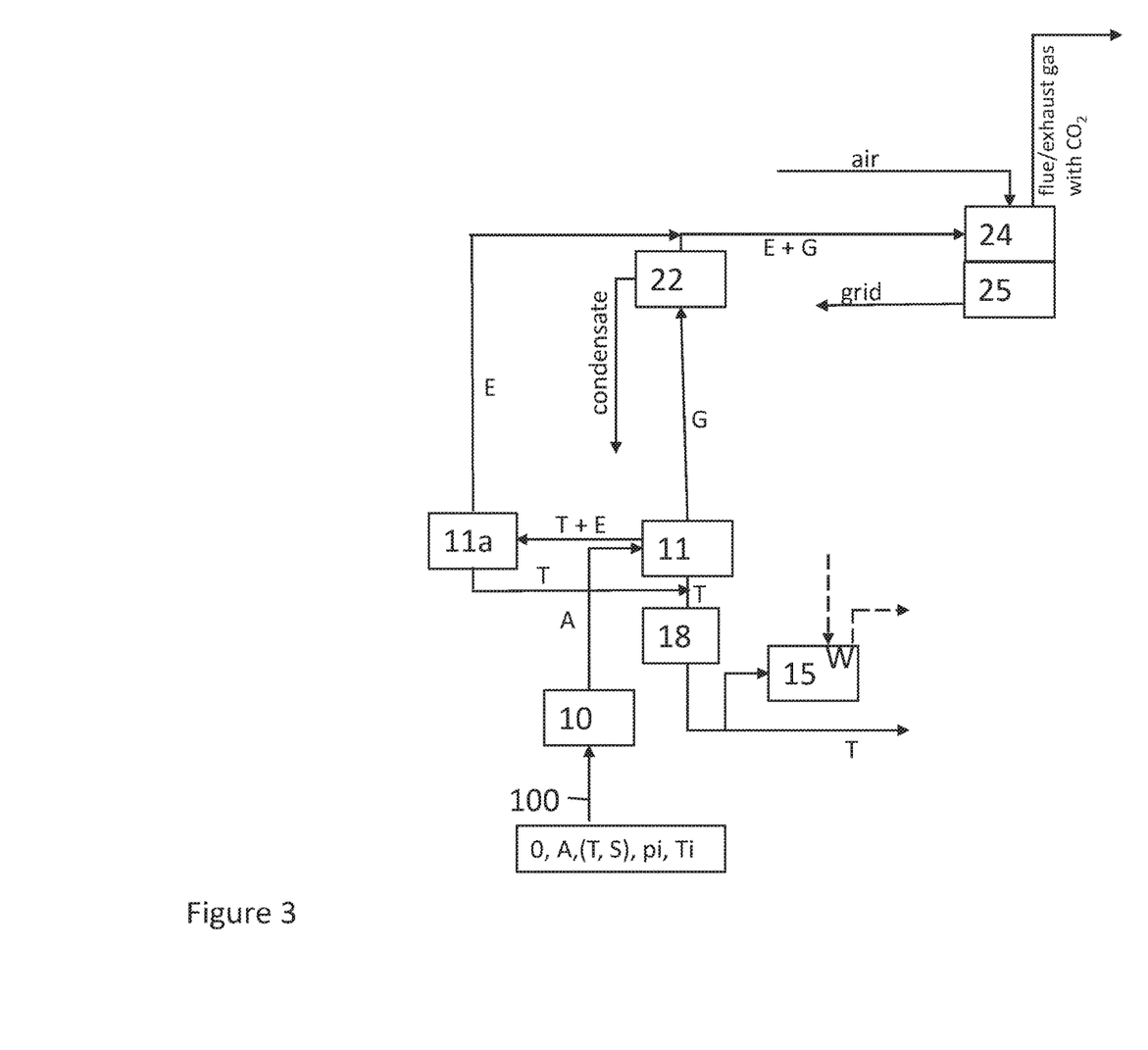
Figure 4:
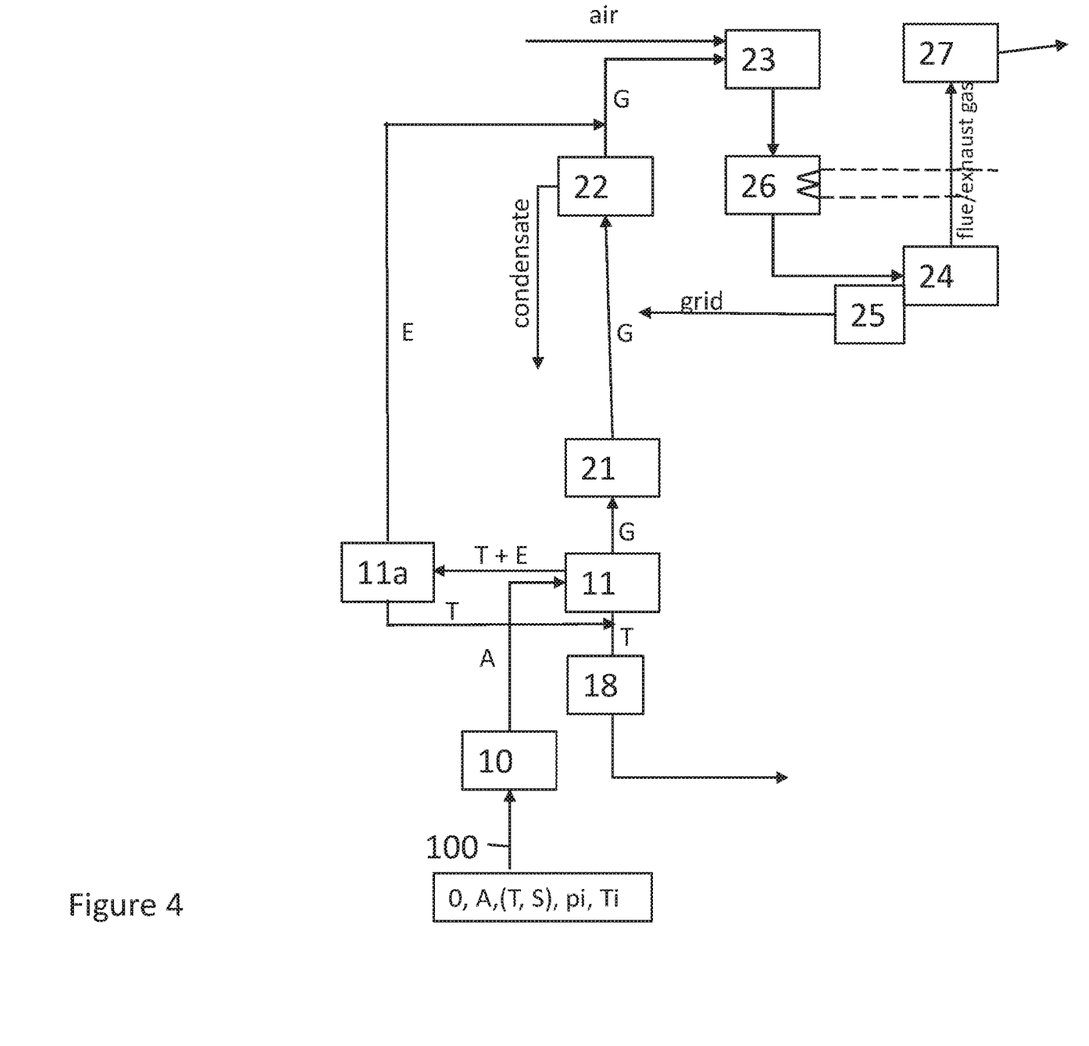

If the aquifer fluid A also comprises crude oil E, it is preferred that the oil is separated in a further separator, in general in a separator downstream of the gas separator. Dependent on the amount, the crude oil can be removed from the circuit or it can be fed to combustion within the circuit.

In case of aquifer fluids A that are under very high pressure, it can be necessary to release part of the pressure, i.e. to the overpressure desired in the circuit, upstream of the gas separator 11. The thereby released energy is suitably also used, e.g. for electricity generation by means of a device like a turbine connected to an electricity generator or a backward running compressor.

The thermal energy of the gas free or degassed, respectively, and optionally crude oil separated thermal water T within the geothermal plant 1 is used in that the thermal water T is fed to at least one device for using thermal energy 12-16 by means of a pump 18. This at least one device for using thermal energy can be, in particular at least one heat exchanger (shown are three heat exchangers 12, 13, 14) or an equipment for generating electricity, like a low pressure steam engine or a waste heat power plant or an ORC (Organic-Rankine-Cycle)-power plant 15, 16 (see below).

This use can be the heating of at least one circulated heating medium or heat transfer medium. In downstream process steps the heating/heat transfer medium leaving the heat exchangers 12, 13, 14 is in particular used as district heating for heating apartments, green houses etc., or for generating electricity.

In an alternative application the heat exchanger is used for operating a low temperature thermal desalination (LTTD) plant. In this process salt water is separated into steam and concentrated salt water first in one or more heat exchangers run with thermal water 12, 13 14 and then optionally in one or more heat exchangers 19, 19a heated with steam (see FIG. 7). In this process it has to be considered that the energy content of the thermal water or the steam, respectively, decreases downstream of heat exchanger 12 and that preferably also the pressure decreases, which might be furthered by using a pump 18a. As a last step in this process a condenser is applied that condenses the steam remaining at the outlet of the last heat exchanger. This condenser could e.g. be cooled with fresh sea water as cooling medium.

Figure 7:
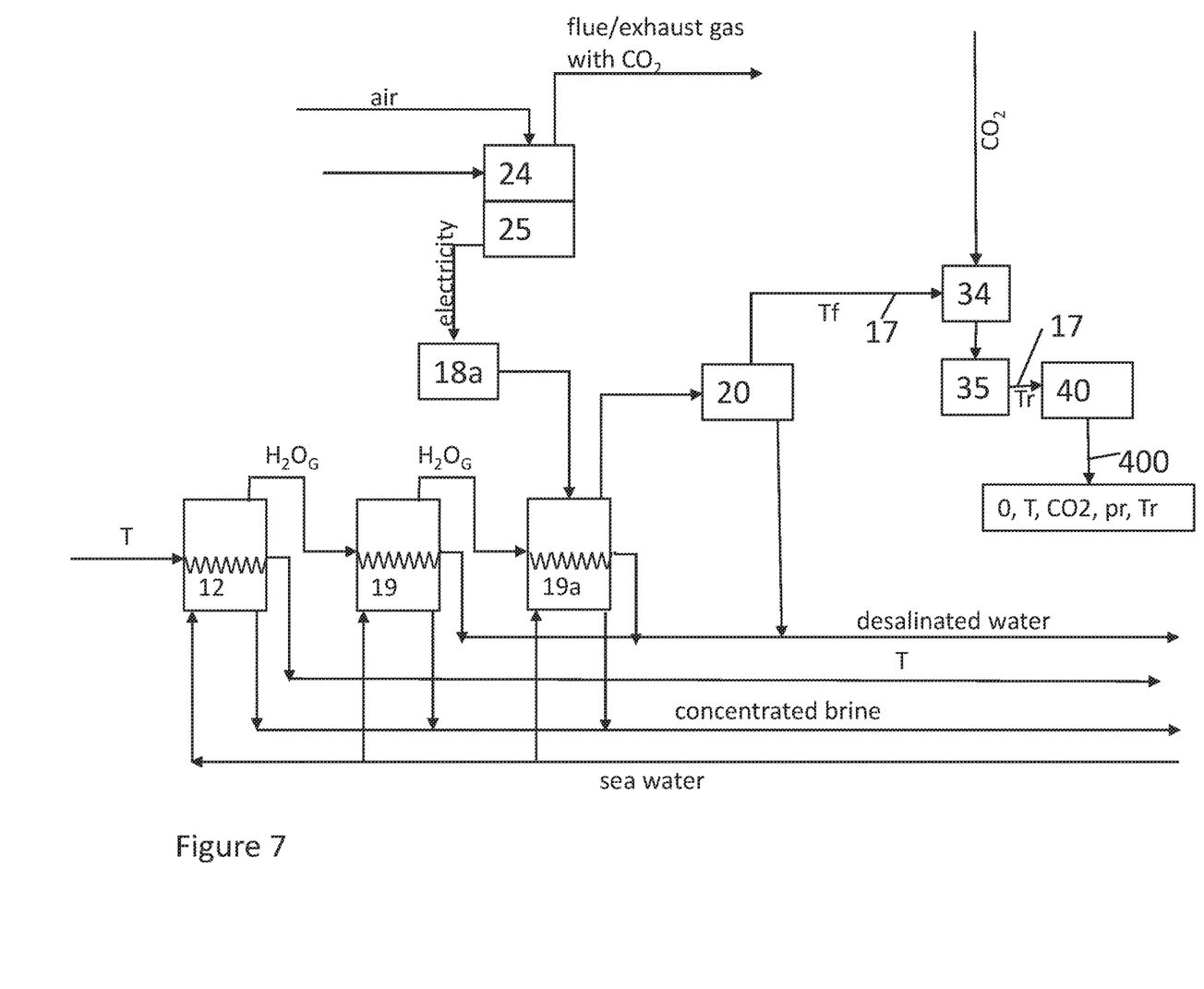

If no water source like a sea is close, instead of sea water also cooled thermal water can be used or another as such not sufficiently clean water source, while sea water is preferred.

Optionally and preferred, the thermal water can be used for electricity generation either in a heat exchanger 15 upstream of heat exchanges 12, 13, 14 or optionally in a heat exchanger integrated into the desalination process, e.g. for condensing the steam in the last step (not shown in the Figures). A suitable process for electricity generation uses e.g. a low pressure steam engine or a waste heat power plant or an ORC-power plant (15, 16). An especially suitable and preferred method for generating electric energy is an ORC-process (Organic-Rankine-Cycle) for gas turbines. In the ORC-process a heat transfer medium is heated above its boiling point in a heat exchanger 15, this heat transfer medium is used to operate a gas turbine 16 and after condensation is recirculated to the heat exchanger 15. For such a process heat transfer media with boiling points that are about 15 to 25° C. below the temperature of the thermal water, e.g. in the range of 45 to 50° C., like 49° C., are suitable. Although the efficiency of such ORC-processes is low (in general <20%, most often <15%) it has been found that the electricity generated in an upstream heat exchanger is most often sufficient for the pump capacity e.g. needed to support the heating circuits in the downstream heat exchangers 12, 13, 14.

Dependent on the energy content of the thermal water the uses can be combined, i.e. use for electricity generation in an ORC-process and/or for generating district heating and/or for desalination.

In order to optimize the combustion process, the combustion device 24 might be supplied not with pure gas G but with gas G premixed with air in a mixing device 23.

In a preferred embodiment, the gas G that had optionally been premixed with air is pre-heated prior to its entering the combustion device 24. This can be done by a heat exchanger 26, the heating medium of which, e.g. water, had been heated with flue gases from the gas combustion in a heat exchanger 29 placed within the flue gas flow.

Also in an alternative method, wherein besides of natural gas also crude oil is combusted, a premixing with air can result in an improved combustion. In this case, however, it might be reasonable to provide for an additional spraying-in of the crude oil or of the crude oil and natural gas mixture in fine droplets.

Figure 5:
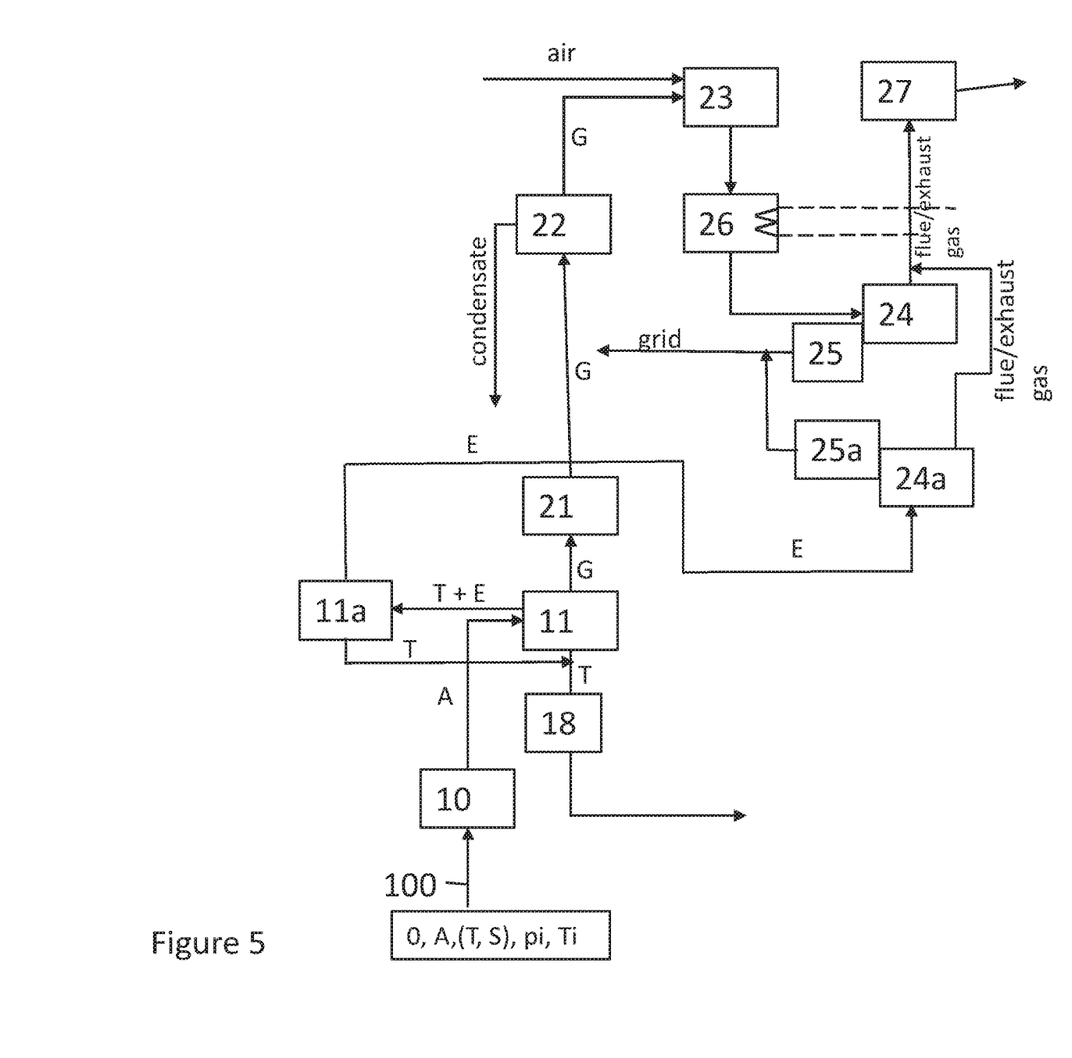

In a further embodiment with separated crude oil combustion often no pre-mixing with air takes place, although such pre-mixing can also be applied here, in particular if the crude oil can be sprayed into the mixing chamber as fine droplets and then immediately fed into the combustion device.

In one embodiment of the inventive method the residual oxygen content in the flue gas is measured with a lambda sensor and then the ratio of fed combustion air to gas G, in particular methane, and optionally crude oil E is appropriately controlled in either a mixing device 23 and/or directly in the combustion device 24. The ratio can be regulated so that the combustion proceeds with high efficiency and as few noxious fumes as possible. In order to prevent any damages in the aquifer 0 upon later reinjection into the aquifer 0, first of all it has to be observed that no oxygen is present in the flue gas since oxygen can lead to damages in the aquifer 0, in particular due to chemical hydrocarbon degradation, like methane degradation. This can be achieved via gas scrubbing in a gas scrubber, in particular an amine scrubber 30 with thereto coupled ammonium carbonate cleavage 31 (see below), optionally together with a controlled combustion and/or a thereon following flue gas treatment in flue gas treatment device 27, e.g. by means of a catalyst.

Downstream of the at least one combustion device 24, 24a at least one generator 25, 25a (preferably one generator per combustion device) is operated by the combustion of gas G and optionally crude oil E performed in the combustion device, said generator providing electricity that can be used to operate devices like pumps within the geothermal plant or that can be fed to the grid. As combustion device 24 gas engines or gas turbines can be used, as combustion device 24a diesel engines.

An optional flue gas purification device 27 downstream of the at least one combustion device 24, 24a and the at least one generator 25, 25a ensures that a better combustion of the gas G and optionally the crude oil E and the atmospheric oxygen is achieved, and that preferably also carbon monoxide and nitric oxides are removed, so that the resulting, forwarded flue gases preferably are low or free, respectively, of oxygen, hydrocarbons, nitric oxides and carbon monoxide and predominantly comprise carbon dioxide, nitrogen and water. As flue gas treatment device 27 for example lambda sensors together with different, known flue gas catalysts can be used. The choice of a suitable catalyst is made based on the type of the used fuels and the used combustion device. For combustion devices that are operated at lambda values of 1, for example controlled catalysts are suitable, like a three-way-catalyst, for lean-burn engines an oxidation catalyst, etc. In case of crude oil combustion catalysts and particle filters known from diesel engines can be used alone or in addition to the catalysts preferred for gas.

In case of more than one combustion device 24, 24a the flue gas flows are combined downstream of the combustion device or between or downstream of one or more catalysts with different suitability.

The energy content of the flue gas flow leaving the at least one combustion device 24, 24a is additionally used in at least one downstream flue gas energy using device, optionally after catalytic processing. The flue gas flow from the combustion process has temperatures of several hundred ° C., as a rule higher than 500° C., and its energy content can be used as heat source or for additional electricity generation, e.g. in one or more ORC-processes. At present the use as heat source is preferred.

For the use as heat source, the flue gas flow can be directly used for heating a heating medium, e.g. thermal oil or water, in one or more heat exchangers 28, 29. For example, the flue gas leaving the combustion device or the at least one catalyst, respectively, with more than 500° C., like 520° C., can be used first in a heat exchanger 28 for heating a heating medium that can be used for recovering the $CO_2$ after amine scrubbing (see below) and the flue gas that has been cooled down to below 200° C., like 140° C., can in a further heat exchanger 29 be used for heating a heating medium that is e.g. used for pre-heating the air-gas-mixture or the air-gas-crude oil-mixture or the gas-crude oil-mixture prior to its feeding into the combustion device 24 or a possible aircrude oil-mixture prior to its feeding into combustion device 24a, respectively, if such pre-heating were intended. In this step, in general, only a slight further cooling is desired, i.e. to slightly above 100° C., like 120° C., so that no condensation takes place within the lines/pipes.

Instead of using the energy of the hot flue gas as heating means it can directly after the combustion device 24 or the flue gas purification device 27, respectively, or after at least one or between several heat exchangers 28, 29 be used for the additional generation of electricity. The production of electricity can for example be performed in one or more ORC-processes (Organic-Rankine-Cycle) for steam turbines—as already described above but optionally with heat transfer medium with higher boiling point (in case of several ORC-processes placed one after the other with decreasing boiling points)—, but also by means of other electricity generating devices, like low pressure steam engines or waste heat power plants. As described above, after generation of electricity the waste heat of the combustion gases can be used for heating the air-gas mixture or for heating cooled thermal water or cooled, circulated heating medium for district heating.

All the cooled and energetically used flue gas that mainly consists of carbon dioxide is—optionally after pre-washing—fed into a gas scrubber 30 for removing other gases, like nitrogen and possibly minor residues of nitric oxides, carbon monoxide and oxygen. In this gas scrubber the $CO_2$ is removed from the gas flow. A preferred gas scrubber 30 is an amine scrubber, wherein the $CO_2$ is removed from the gas flow with an amine, like an amine of formula $NR_xH_{3-x}$, for example an alkyl amine. The solution containing dissolved ammonium carbonate is then decomposed at a temperature above 100° C., like 140° C., in a device for decomposing ammonium carbonate $(HNR_xH_{3-x})_yH_{2-y}CO_3$ (amine cooker) 31 (preferably heated with heating medium that has been heated by flue gas, e.g. in heat exchanger 28). The amine liberated in device 31 is recirculated into gas scrubber 30. The wet $CO_2$ is fed to a compressor 33 via condenser 32 (possibly a heat exchanger and downstream to it a condenser 32). In one embodiment, the compressed $CO_2$ is mixed with the cooled thermal water to be recirculated in the recirculation line/pipe 17 by means of a mixing device, like a trickling scrubber, 34. In another embodiment, the $CO_2$ is compressed to the supercritical state in the compressor and directly injected into aquifer 0 via recirculation line/pipe 17a, recirculation equipment 40 and recirculation borehole 400 down to a depth where the hydrostatic pressure corresponds to the pressure of the $scCO_2$. The water removed in condenser 32 and having a temperature of usually less than 170° C. can optionally be fed to the thermal water that is used in a process for generating electricity, like an ORC-process 15, 16 and/or for generating district heating in one or more heat exchangers 12, 13, 14 in order to extract the therein comprised heat energy. If a heat exchanger is provided upstream of the condenser 32, the therein produced energy can e.g. be used to heat the thermal water for use in an ORC-process 15, 16 or for direct additional heating of the heat transfer medium in the ORC-process.

The heat comprised in the flue gases from the combustion process can—if present in excess—at any point be used in one or more heat exchangers of a desalination plant (conventional or according to the LTTD-method described in FIG. 7).

Downstream of the last heat exchanger, e.g. heat exchanger 14, the cooled thermal water T has a temperature Tf based on which the pressure needed to dissolve the carbon dioxide in the thermal water can be determined. Suitable values for temperature Tf and the temperature of the recirculated thermal water Tr have been found to be less than 35° C., in particular 32° C. or less, much preferred 30° C. or less, such as 27° C. or less. Pressure and temperature must be chosen such that the $CO_2$ completely dissolves in the cooled thermal water. For dissolving all the carbon dioxide generated during the combustion in the cooled thermal water, for example at a temperature of 27° C., in general a pressure of 9 bar is needed.

In procedural respect the dissolving of the carbon dioxide has to be performed such that generation of gas bubbles is prevented, which can be achieved by cooling the thermal water, selecting the pressure as mentioned above and a suitable mixing device, in particular a trickling scrubber 34. The recirculation/reinjection pressure pr on the thermal water mixed with flue gas or $CO_2$, respectively, in general corresponds to at least the initial pressure pi on the aquifer fluid A in aquifer 0. A risk for an explosion upon the feeding of the flue gas into the thermal water is excluded since during the combustion care had been taken that no combustible hydrocarbons or oxygen are present in the flue gases and by an entirely closed process management, so that any access of ambient oxygen is prevented. For feeding the carbon dioxide to the thermal water or for dissolving it in the thermal water, respectively, the gas pressure and the liquid level should be controlled in the trickling scrubber 34.

Through at least one and preferably as many reinjection boreholes 400 as withdrawal boreholes 100, each of them coupled to a recirculation equipment 40 with at least one reinjection pump 35, the thermal water mixed with carbon dioxide and having a recirculation temperature Tr and a recirculation pressure pr can be recirculated into the aquifer 0. Several measurements have shown that by the recirculation of the generated carbon dioxide the liberation of gas G from the rock strata of the aquifer 0 is stimulated so that by applying the method the useful life of the aquifer 0 can be extended.

Figure 6:
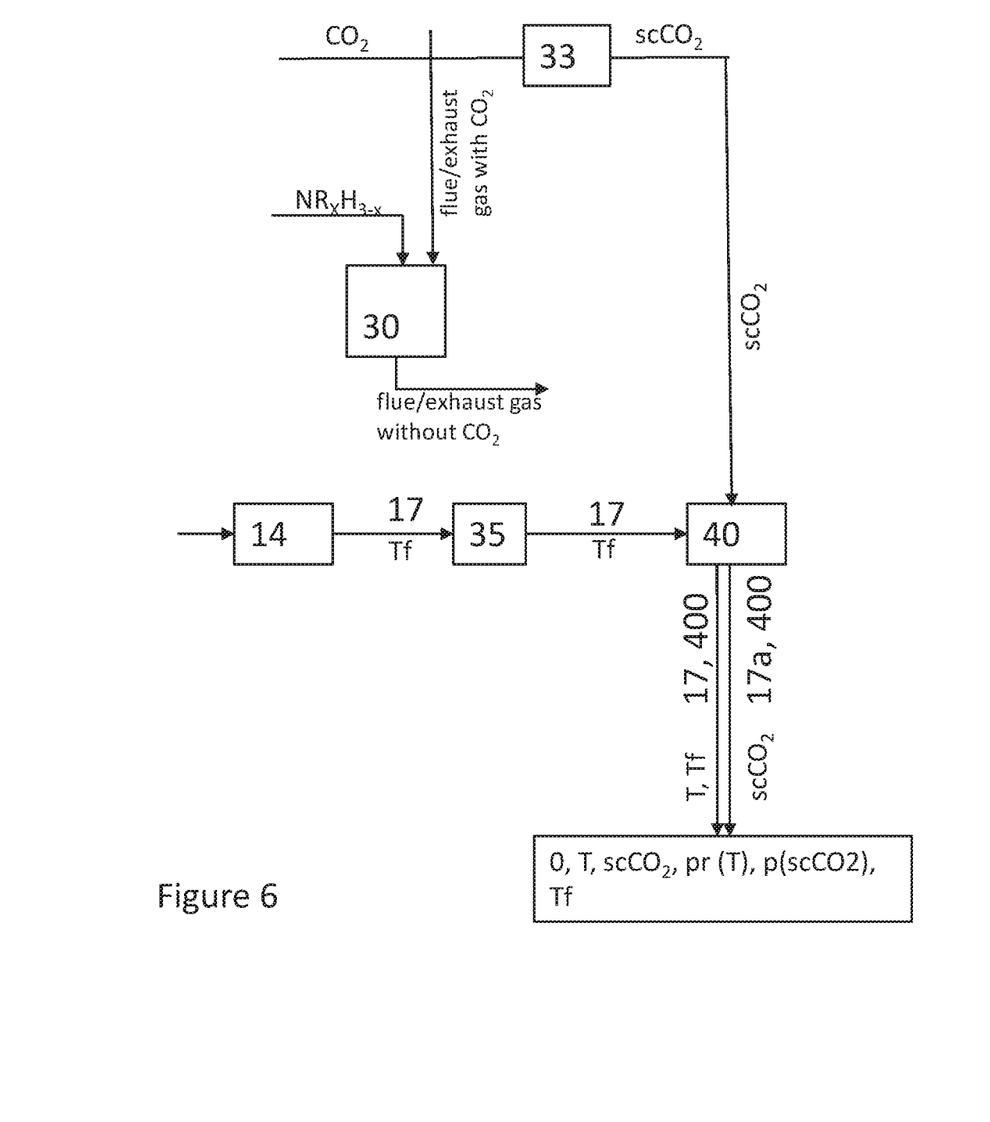
FIG. 6 a schematic view of a part of the geothermal plant of FIG. 1 or 2 with alternative, separate reinjection of $CO_2$ as sc$CO_2$ and thermal water, and
FIG. 7 a schematic view of a part of the geothermal plant of FIG. 1 or 2 with alternative utilization of the thermal water for desalination of sea water.

In particular when the temperature Tf downstream of the last heat exchanger still has a temperature of 35° C. or more, it has been found advantageous to compress the $CO_2$ to the supercritical state (sc$CO_2$) and to pump it into the aquifer separately from the thermal water. The feeding into the thermal water then takes place at a pressure within the aquifer that corresponds to the pressure of the sc$CO_2$ (at about 31° C. usually about 74 bar). Such a pressure is most often found in a depth of 700 to 800 m. After feeding the sc$CO_2$ to thermal water T or dissolving it in thermal water T, respectively, this solution can be fed deeper into the aquifer.

An enhanced $CO_2$-content in the withdrawn aquifer fluid due to the reinjection of the $CO_2$-containing thermal water is not expected, since the cooled, reinjected, $CO_2$-comprising thermal water has higher density than the hot aquifer fluid and therefore sinks down within aquifer 0 so that aquifer fluid withdrawn in an upper region of the aquifer remains poor in $CO_2$, and due to the distance between recirculation and withdrawal. Based on calculations, in case of average aquifer sizes a utilization for years should be possible without having to assume an increase in the $CO_2$-content of more than 2%.

The here presented method is (with the herein addressed exceptions) a closed circuit, wherein the utilization of the energy of the withdrawn aquifer fluid A has been maximized and the thermal water and the generated flue gases after utilization are recirculated into aquifer 0 via at least one reinjection borehole 400. The at least one reinjection borehole 400 preferably is distant from the at least one withdrawal borehole 100 in aquifer 0 for a distance L. In order to minimally disturb aquifer 0, it is preferred to space the withdrawal borehole 100 and the reinjection borehole 400 several 100 meters to a few kilometers apart. Preferably, the withdrawal equipment 10 and the recirculation equipment 40 are independent from each other, whereby one pumping equipment is used for withdrawing aquifer fluid A and one for reinjecting thermal water and $CO_2$ separated from each other.

In order to avoid clogging of the withdrawal or reinjection boreholes, it has proved possible and preferred in this method that the process direction is reversible, i.e. the withdrawal borehole 100 becomes the reinjection borehole 400 and the reinjection borehole 400 becomes the withdrawal borehole 100. This can be achieved in that each borehole or each withdrawal equipment and reinjection equipment is provided with two pumps, one of them serving for withdrawal and the other one for reinjection, and in that each borehole is provided with pipes that allow either the feeding of the separation device 11 or the recirculation into aquifer 0, and in that they can be controlled according to need. A further necessity is that the withdrawal boreholes 100 and the reinjection boreholes 400 are close to the geothermal plant and in close distance from each other at the surface, which can be achieved by inclined execution of the boreholes, e.g. so that the distance at the surface is for example 5 to 15 m, like about 10 m, and in the aquifer 0 up to about 2 km.

In a modification, besides of the $CO_2$ generated in combustion device 24, also anthropogenic $CO_2$ from industry or other sources can be dissolved in the thermal water and fed into aquifer 0 via reinjection borehole 400 and geologically stored. Therewith, a further $CO_2$ sequestration is achievable.

A possible inlet for additional anthropogenic $CO_2$ is preferably upstream of the gas scrubber, so that this $CO_2$ is also purified.

Under some circumstances, the recirculation of the thermal water, optionally mixed with flue gas, results in the stimulation of the aquifer 0 thereby extending the utilization of the resources.

Dependent on the design of the single parts of the geothermal plant and the energy content of the aquifer, more than one of the above described devices/equipments can be present—in parallel or in series—and these are also encompassed by the present invention, even if not explicitly mentioned.

Retrofitting:

For some already existing geothermal plants it might be reasonable to retrofit them so that the energy utilization method approximates the above described optimized energy utilization method, or that even this optimized method can be carried out. An existing geothermal plant for using the inner energy of thermal water T comprising gas G and optionally crude oil E from an aquifer 0, today in general comprises a withdrawal equipment 10 for aquifer fluid A, a gas separation device 11, a combustion device 24 for separated gas as well as a recirculation equipment 40 for reinjecting the cooled thermal water T into the aquifer 0.

On the one hand, such plants can be retrofitted with one of the especially suitable separation devices 11, (i) wherein the separation of the gas G from the thermal water T is performed by generating a large surface, the temperature and optionally the release of the aquifer fluid produced under pressure, or (ii) wherein the separation of the gas G from the thermal water T is performed under pressure in a separator with high surface, and which the gas G leaves at a temperature similar to Ti and can optionally be used in at least one device for using thermal energy, in particular heat exchanger 21.

Alternatively or in addition existing plants can be retrofitted with a flue gas purification/flue gas utilization plant comprising at least one of the following additional equipments:

(i) at least one device for generating electricity, like a gas engine with downstream generator and/or an ORC-power plant, (ii) at least one heat exchanger for using the energy comprised in the flue gas, (iii) a gas scrubber 30, coupled with a compressor for (a) feeding $CO_2$ into the cooled thermal water prior to its reinjection into the aquifer 0 or (b) for compressing the $CO_2$ until it reaches the supercritical state and its direct reinjection into the aquifer 0, wherein the gas scrubber is in particular an amine scrubber 30, coupled to a downstream device for decomposing the ammonium carbonate formed in the amine scrubber (amine cooking) 31, (iv) a trickling scrubber 34 for mixing the $CO_2$ into the thermal water, (v) a mixing device 23 for mixing the gas and optionally the crude oil with combustion air upstream of the combustion device 24 and/or a flue gas purification device 27 downstream of the combustion device 24, 24a, said flue gas purification device 27 comprising at least one catalyst and a lambda sensor for controlling the combustion/pre-mixing of the gas with combustion air, (vi) if the aquifer fluid comprises no crude oil and no or not enough gas, a connecting pipe to a natural gas pipeline or a crude oil pipeline for feeding natural gas or crude oil into mixing device 23 or combustion device 24, 24a, so that the geothermal plant can be used for the CCS (carbon capture and storage)-process, (vii) coupling with a desalination plant, like a desalination plant operated by the LTTD-process, in particular a plant for desalination of sea water, (viii) if the aquifer is under very high pressure, a release device upstream of the separation device converting pressure into electricity.

If at least one, preferably more than one, in particular all the above mentioned devices (i) to (v) and optionally (vi) to (viii) are joined to an existing geothermal plant, the energy content of the aquifer fluid A can better to close to entirely be used and the recirculation of the $CO_2$-containing thermal water can be performed without affecting aquifer 0.

The inventive method or the inventive geothermal plant, respectively, can also be used for aquifers comprising few or no combustible gases and/or few or no crude oil, provided that an external gas source, in particular a natural gas source, like a gas pipeline is available. Such a plant has no gas separation device 11 and the aquifer fluid/thermal water is directly fed to the utilization of thermal energy 12-16. External gas is directly fed into the combustion device or into a combustion improving device upstream of it. As an alternative, but less preferred, also an external crude oil source could be used.

While there are shown and described presently preferred embodiments of the invention, it is to be distinctly understood that the invention is not limited thereto but may be otherwise variously embodied and practiced within the scope of the following claims.

LIST OF REFERENCES

0 aquifer
1 geothermal plant
10 withdrawal equipment/withdrawal device
100 withdrawal borehole
11 gas separation device (separator)
11a crude oil separation device (oil separator)
12-14 devices or equipments, respectively, for using the thermal energy of thermal water, in particular heat exchangers
15, 16 devices/equipments/plants for using the thermal energy of the thermal water for electricity generation like a low pressure steam engine or a waste heat electricity generation equipment or in particular an ORC electricity generation plant
17 recirculation pipe/reinjection pipe
18 pump
18a pump for slight pressure reduction in the LTTD-process
19, 19a heat exchangers for using the energy comprised in the steam in a LTTD-process
20 condenser or ORC electricity generation equipment
21 device (heat exchanger) for the utilization of the thermal energy of the gas
22 device (condenser) for drying the gas with removal of condensed water and optionally for using the thermal energy of the gas
23 mixing device
24, 24a (gas) combustion devices
25, 25a (electricity) generators
26 heat exchanger for pre-heating the gas
27 flue gas treatment equipment/flue gas treatment device/flue gas catalyst and lambda sensor
28, 29 device for using the thermal energy in the flue (exhaust) gas/flue gas energy utilization device, in particular heat exchanger
30 gas scrubber equipment, gas scrubber (amine scrubber, amine scrubber equipment)
31 device for decomposition of ammonium carbonate (amine cooker)
32 condenser
33 compressor
34 mixing device, in particular a trickling scrubber
35 reinjection pump
40 recirculation device/sequestration device
400 reinjection borehole
A aquifer fluid/thermal water comprising gas (T+G)
Ti initial temperature of the aquifer fluid
pi initial pressure
T thermal water
Tf temperature of the cooled degassed thermal water
Tr temperature of the recirculated $CO_2$-comprising thermal water
pr reinjection pressure on the flue gas comprising thermal water
G gas
E crude oil L distance between withdrawal borehole and reinjection borehole

The invention claimed is:

1. A method for using the inner energy of an aquifer fluid comprising geothermic thermal water mixed with dissolved gas in a closed circuit, wherein the method comprises the steps
- producing aquifer fluid from an aquifer by means of a withdrawal equipment via more than one withdrawal borehole,
- separating gas by degassing the aquifer fluid in a gas separation device resulting in degassed thermal water,
- using the heat energy of the degassed thermal water in at least one device/equipment for using thermal energy comprising at least one first heat exchanger, as well as
- performing at least one combustion process with the separated gas in at least one combustion device, that is a gas engine, and using the inner energy of the gas by operating at least one generator, wherein a flue gas is produced by said at least one combustion device,
- removing undesired substances from the flue gas by means of a first flue gas purification device comprising an amine scrubber with a downstream positioned device for decomposing ammonium carbonate by-product produced by the first flue gas purification device into amine and $CO_2$ by heating the ammonium carbonate with heating medium that has been heated with the flue gas and recirculating the amine into the amine scrubber, and
- reinjecting the $CO_2$ and the cooled thermal water into the aquifer through more than one reinjection borehole distant from the more than one withdrawal boreholes in order to minimally disturb the aquifer,
- wherein a mixing device for mixing gas with combustion air is positioned upstream of the at least one combustion device, and wherein the mixing ratio is regulated by means of a lambda sensor positioned in a stream of the flue gas,
- wherein the gas-air-mixture prior to being fed into the at least one combustion device is pre-heated in a second heat exchanger, and
- wherein flue gas purification is performed in a second flue gas purification device comprising a catalyst, downstream of the at least one combustion device, and
- wherein reinjection of the $CO_2$ and the cooled thermal water is performed either:
- by compressing the $CO_2$ to the supercritical state prior to reinjection and wherein the reinjection of the $scCO_2$ and the cooled thermal water into the aquifer is performed separately down to a depth where the pressure in the aquifer is such that the $CO_2$ remains in supercritical state, dissolving the $CO_2$ into the simultaneously reinjected cooled thermal water and feeding the solution deeper into the aquifer, or
- by compressing the $CO_2$ and then feeding the $CO_2$ into the cooled thermal water by a trickling scrubber, followed by reinjection of the thermal water mixed with $CO_2$ into the aquifer, and
- wherein reinjection into the aquifer is at a depth of 2000 to 2500 m for final sequestration.

2. The method for using the inner energy of an aquifer fluid of claim 1, wherein, besides of the operation of at least one generator, the use of the inner energy of the separated gas comprises the use of the thermal energy in the waste heat of the flue gas after electricity generation in at least one further flue gas energy utilization device that is at least one third heat exchanger.

3. The method for using the inner energy of an aquifer fluid of claim 1, wherein the at least one first heat exchanger is used for heating at least one circulated heating medium and/or for performing a desalination process according to a low-temperature thermal desalination (LTTD) process.

4. The method for using the inner energy of an aquifer fluid of claim 1, wherein the withdrawal of the aquifer fluid and the reinjection of the $CO_2$ and the thermal water proceeds via more than one withdrawal borehole or more than one reinjection borehole, respectively, wherein each borehole is provided with a withdrawal equipment or a reinjection equipment, respectively.

5. The method for using the inner energy of an aquifer fluid of claim 1, wherein the withdrawal of aquifer fluid is performed simultaneously via several withdrawal boreholes and the reinjection is performed simultaneously via several reinjection boreholes.

6. The method for using the inner energy of an aquifer fluid of claim 1, wherein the $CO_2$ is fed into the cooled thermal water by the trickling scrubber, followed by reinjection of the thermal water mixed with $CO_2$ into the aquifer, and wherein the formation of gas bubbles upon reinjection of the thermal water mixed with carbon dioxide is prevented in that a recirculation pressure on the carbon dioxide and a recirculation temperature are chosen such that the $CO_2$ is completely dissolved in the thermal water.

7. The method for using the inner energy of an aquifer fluid of claim 1, wherein prior to its feeding into the gas separation device the pressure of the aquifer fluid is released in a pressure release device that converts pressure into electricity and that is positioned upstream of the gas separation device.

8. A geothermal plant for using the inner energy of thermal water mixed with dissolved gas from an aquifer in a closed circuit comprising
- at least one withdrawal equipment for aquifer fluid in the area of a respective withdrawal borehole of more than one borehole,
- a gas separation device for separating the aquifer fluid into thermal water and gas,
- at least one device for using the thermal energy comprising at least one first heat exchanger, for using the thermal energy comprised in the thermal water for heating circulated heating medium and/or at least one equipment for using thermal energy for electricity generation comprising a ORC-power plant, and/or for operating a desalination plant,
- a combustion device for separated gas that is a gas engine, with at least one thereto coupled generator for generating electricity, the combustion device producing a flue gas,
- at least one device for using the thermal energy in a stream of the flue gas,
- an amine scrubber with a downstream positioned device for decomposing ammonium carbonate by-product produced by the amine scrubber into amine and $CO_2$, the ammonium carbonate heated with heating medium that has been heated with flue gas for separating the $CO_2$, said amine scrubber being arranged in the stream of flue gas downstream of the at least one device for using its thermal energy,
- a supply/feed line for the $CO_2$ obtained after gas scrubbing into either a compressor and then via a mixing device, into a recirculation line for the thermal water leaving the at least one first heat exchanger or an ORC-power plant or a desalination plant, or such supply/feed line into a compressor for bringing the $CO_2$ into the supercritical state and then into a supply/feed line for $scCO_2$ that is separate from a supply/feed line for thermal water and which both lead into the aquifer, at least one recirculation equipment for reinjecting the carbon dioxide and the cooled thermal water into the aquifer through more than one reinjection boreholes distant from the more than one withdrawal boreholes in order to minimally disturb the aquifer, mixing device upstream of the at least one combustion device for mixing the gas with combustion air, and a flue gas treatment device, downstream of the combustion device, wherein the at least one recirculation equipment is configured to either:

separately recirculate $CO_2$ compressed to supercritical state ($scCO_2$) and cooled thermal water into the aquifer down to a depth where the pressure in the aquifer is such that the $CO_2$ remains in supercritical state, dissolve the $CO_2$ into the simultaneously reinjected cooled thermal water, and the feed the solution deeper into the aquifer, or feed compressed $CO_2$ into the cooled thermal water by a trickling scrubber, and then reinject the thermal water mixed with $CO_2$ into the aquifer, wherein the recirculation equipment is configured to reinject the $CO_2$ and cooled thermal water into the aquifer at a depth of 2000 to 2500 m for final sequestration.

9. The geothermal plant of claim 8, wherein the flue gas treatment device comprises a catalyst and a lambda sensor and wherein the mixing device regulates the admixture of oxygen dependent on the measurements of the lambda sensor is positioned upstream of the combustion device, thereby enabling a controlled combustion.

10. The geothermal plant of claim 8, wherein the at least one device for using the thermal energy in the stream of flue gas comprises a second heat exchanger is arranged in the stream of flue gas.

11. The geothermal plant of claim 10, wherein the at least one first heat exchanger for using the thermal energy of the thermal water and/or the at least one second heat exchanger arranged in the stream of flue gas are part of a desalination plant a desalination plant operated according to a low-temperature thermal desalination (LTTD) process.

12. The geothermal plant of claim 8, wherein this plant comprises a supply/feed line for additional carbon dioxide from an anthropogenic source in such a way that the additional carbon dioxide can be fed to the flue gas upstream of the amine scrubber, so that it can be dissolved in the cooled thermal water together with the $CO_2$ from the flue gas by means of the trickling scrubber, and recirculated into the aquifer by means of the recirculation equipment, or so that it can be fed to the compressor for being brought into the supercritical state together with the $CO_2$ from the flue gas and then recirculated into aquifer via recirculation line/pipe for $scCO_2$.

13. The geothermal plant of claim 8, wherein an equipment for generating electricity is arranged downstream of the gas separation device, said equipment being an ORC-power plant.

14. The geothermal plant of claim 8, wherein a pressure release device is positioned upstream of the gas separation device, wherein the pressure in the aquifer fluid is partially transformed into electricity.

15. The geothermal plant of claim 8, wherein the thermal water is mixed with dissolved gas and crude oil, and the geothermal plant further comprises:

a separation device for separating the crude oil from the degassed thermal water; and a second combustion device for separated crude oil that is a diesel engine, with at least one thereto coupled generator for generating electricity, and wherein the mixing device mixes gas and crude oil with combustion air.

16. A method for using the inner energy of an aquifer fluid comprising geothermic thermal water mixed with dissolved gas and crude oil in a closed circuit, wherein the method comprises the steps producing aquifer fluid from an aquifer by means of a withdrawal equipment via more than one withdrawal borehole, separating gas by degassing the aquifer fluid in a gas separation device resulting in degas sed thermal water, separating crude oil resulting in degassed and oil-free thermal water, using the heat energy of the degassed thermal water in at least one device/equipment for using thermal energy comprising at least one first heat exchanger, as well as performing at least one combustion process with the separated gas and the separated crude oil in at least one combustion device, that is a gas engine or a diesel engine, and using the inner energy of the gas and crude oil by operating at least one generator, wherein a flue gas is produced by said at least one combustion device, removing undesired substances from the flue gas by means of a first flue gas purification device comprising an amine scrubber with a downstream positioned device for decomposing ammonium carbonate by-product produced by the first flue gas purification device into amine and $CO_2$ by heating the ammonium carbonate with heating medium that has been heated with the flue gas and recirculating the amine into the amine scrubber, and reinjecting the $CO_2$ and the cooled thermal water into the aquifer through more than one reinjection borehole distant from the more than one withdrawal boreholes in order to minimally disturb the aquifer, wherein a mixing device for mixing gas and crude oil with combustion air is positioned upstream of the at least one combustion device, and wherein the mixing ratio is regulated by means of a lambda sensor positioned in a stream of the flue gas, wherein the crude oil-air-mixture or the crude oil-gas-mixture prior to being fed into the at least one combustion device is pre-heated in a second heat exchanger, and wherein flue gas purification is performed in a second flue gas purification device comprising a catalyst, downstream of the at least one combustion device, and wherein reinjection of the $CO_2$ and the cooled thermal water is performed either:

by compressing the $CO_2$ to the supercritical state prior to reinjection and wherein the reinjection of the $scCO_2$ and the cooled thermal water into the aquifer is performed separately down to a depth where the pressure in the aquifer is such that the $CO_2$ remains in supercritical state, dissolving the $CO_2$ into the simultaneously reinjected cooled thermal water and feeding the solution deeper into the aquifer, or by compressing the $CO_2$ and then feeding the $CO_2$ into the cooled thermal water by a trickling scrubber, followed by reinjection of the thermal water mixed with $CO_2$ into the aquifer, and wherein reinjection into the aquifer is at a depth of 2000 to 2500 m for final sequestration.

17. The method for using the inner energy of an aquifer fluid of claim 16, wherein, besides of the operation of at least one generator, the use of the inner energy of the separated gas and the crude oil comprises the use of the thermal energy in the waste heat of the flue gas after electricity generation in at least one further flue gas energy utilization device that is at least one third heat exchanger.

* * * * *